United States Patent

Nercessian

[15] 3,704,381
[45] Nov. 28, 1972

[54] HIGH STABILITY CURRENT REGULATOR CONTROLLING HIGH CURRENT SOURCE WITH LESSER STABILITY

[72] Inventor: Sarkis Nercessian, Long Island City, N.Y.

[73] Assignee: Forbro Design Corp., New York, N.Y.

[22] Filed: Sept. 2, 1971

[21] Appl. No.: 177,376

[52] U.S. Cl. ..........................307/53, 307/60, 323/4, 323/25
[51] Int. Cl. ...............................................H02j 1/10
[58] Field of Search..........307/44, 48, 51, 52, 53, 59, 307/60; 323/4, 15, 22 T, 23, 25, 40

[56] References Cited

UNITED STATES PATENTS 3,466,455    9/1969    Hecht et al. ..................307/53

*Primary Examiner*—A. D. Pellinen
*Attorney*—Alfred W. Barber

[57] ABSTRACT

Two current regulated power supplies are connected across a common load impedance. A first regulated power supply having high stability characteristics is connected in a conventional feedback manner to regulate current to the load. A second feedback power supply having lesser stability characteristics than the first but greater output current capabilities is connected to null the sum of opposing voltage drops, one across a current sensing resistor in series with the first power supply and the load and the other in series with the second power supply and the load. The ratio of the resistances of the latter two resistors controls the relative current contribution of the two power supplies to the total load current.

8 Claims, 2 Drawing Figures

INVENTOR.
SARKIS NERCESSIAN

BY

Alfred W. Barber
ATTORNEY

HIGH STABILITY CURRENT REGULATOR CONTROLLING HIGH CURRENT SOURCE WITH LESSER STABILITY

The regulation of current supplied to a load by an operational type power supply may be carried out by sensing the voltage across a resistor, called a current sensing resistor, connected in series with the load and the output of the power supply and then by feeding back this voltage to the input of the power supply in a degenerative mode. The degree of regulation and stability of the current through the load of such a system depends on several factors including the stability of the reference in the power supply, the open and closed loop gain of the system and the magnitude of the voltage across the current sensing resistor. In order to maintain a reasonable efficiency in a high current system, the current sensing resistor must be small resulting in a relatively small feedback voltage. Many high current regulated power supplies in current use, also, do not incorporate the latest high stability reference voltage sources. The net result is that there is a current need for improving current regulation through a load particularly in the case of large currents, say 10 to 100 amperes or more.

SUMMARY

In accordance with the present invention, a high stability current regulated power supply is connected to a load through a conventional current sensing resistor. A second power supply capable of supplying high current, although of lesser stability, is connected through a second current sensing resistor and across the load. A third (current proportioning) resistor is connected in series with the load and the output of the first power supply. The null junction of the second power supply is connected across the second and third resistors.

In operation the first or stabilizing power supply, sensing the total current in the load, provides a corrective voltage drop across the third resistor. The booster power supply (the second power supply) senses the voltage across the second current sensing resistor carrying its own output current and the oppositely poled voltage drop across the current proportioning resistor (in the output circuit of the stabilizing power supply) and regulates to tend to make these two voltages equal. If the current from the booster power supply tends to change, the stabilizing power supply produces a corrective voltage at the null junction circuit of the booster power supply. Furthermore, the ratio of the currents supplied by the two power supplies will be proportional to the ratio of the second current sensing and current proportioning resistors. For example, if the third current proportioning resistor has fifty times the resistance of the second current sensing resistor, the booster supply will provide fifty times the current of the stabilizing supply. In this way a small but highly stable current regulator can be used to stabilize and control very large currents from a less stable but high current power supply.

Figure 1:
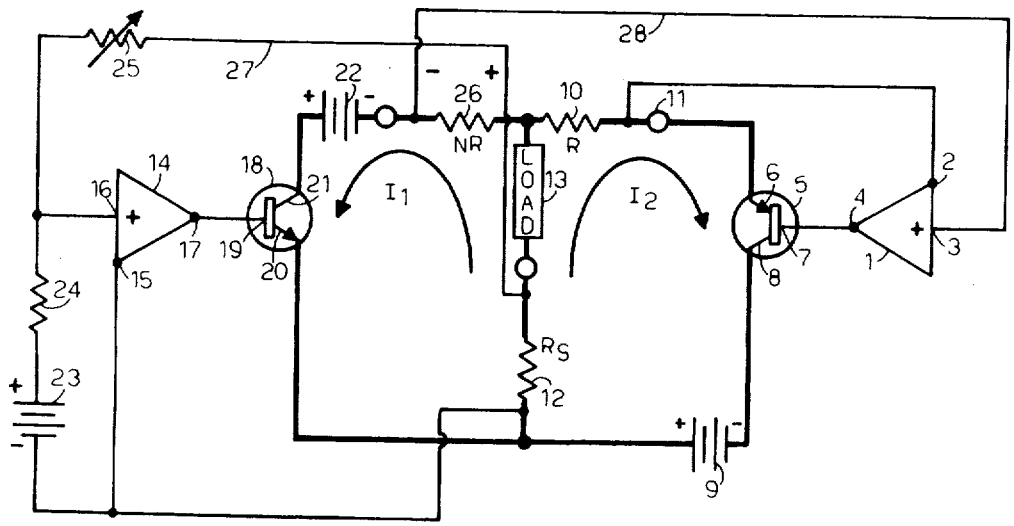
FIG. 1 is a simplified schematic circuit diagram of the preferred form of the present invention.

FIG. 1 shows a highly stable feedback power supply including: amplifier 14, having a non-inverting input terminal 16, a common terminal 15 and an output terminal 17; a reference voltage source represented by battery 23 and connected in series with reference resistor 24 between common terminal 15 and input terminal 16; pass transistor 18 having a base 19, an emitter 20 and a collector 21; an unregulated source of voltage represented by battery 22, and an adjustable feedback resistor 25 having one end connected to input terminal 16. This first power supply is intended to be one of high stability and having a highly stable reference. It is connected as a current regulator to load 13. This is carried out by the first current sensing resistor 12 connected in series with the load and between the common terminal 15 of amplifier 14 and feedback resistor 25 over lead 27. The negative or return end of unregulated source 22 is connected through current proportioning resistor 26 to the upper end of the load (the end remote from the current sensing resistor). Up to this point the high stability current regulator has been described. One unconventional element, the current proportioning resistor in series with the output and the load has been included. The function of this resistor will become evident in the further description below.

A second or booster power supply is used to greatly increase the current to the load but under control of the first power supply so that the overall regulation and stability of the load current is essentially attributable to the regulation and stability of the first power supply. The second or booster power supply includes operational or differential amplifier 1 having a common terminal 2, a non-inverting input terminal 3 and an output terminal 4; pass transistor 5 having an emitter 6, a base 7 and a collector 8; and an unregulated source of voltage represented by battery 9. The amplifier output terminal 4 is connected to the pass transistor base 7. The unregulated source 9 is connected between collector 8 and the lower end of current sensing resistor 12 (remote from the load connected end). Emitter 6 is connected through second current sensing resistor 10, at terminal 11, to the upper end of load 13. Common terminal 2 is connected to second current sensing resistor 10 preferably in a "four terminal" connection manner. Input terminal 3 is connected to current proportioning resistor 26 at the end adjacent to unregulated source 22, also preferably in a four terminal connection manner.

Now, it will be seen that current supplied by the second or booster power supply passes through the load 13 and through current sensing resistors 10 and 12. The load current contributed by this second power supply provides a voltage drop across current sensing resistor 10 which is proportional to its contribution to the total load current. The voltage between the amplifier common terminal 2 and input terminal 3 is the sum of this latter voltage drop and the voltage drop in current proportioning resistor 26 as supplied by the first or reference power supply. Since the currents in resistors 10 and 26 flow in opposite directions, the voltage drops due to these currents are in opposition. Amplifier 1 is an amplifier chosen to drive pass transistor 5 so as to produce a null between terminals 2 and 3. Thus, the current through pass transistors 5 and current sensing resistor 10 is controlled to tend to make the voltage drop across current sensing resistor 10 equal and opposite to the voltage drop across current proportioning resistor 26. If the reference supply calls for more current in order to correct the load current as sensed across resistor 12, the voltage drop across current proportioning resistor 26 is increased and the booster power supply must supply more current to produce an equalizing voltage drop across current sensing resistor 10.

Mathematically expressed, if current sensing resistor 10 has a resistance R, and current proportioning resistor 26 has a resistance NR, the current supplied through NR by the regulating power supply is $I_1$ and the current supplied by the booster power is $I_2$, there will be a null at the input to amplifier 1 between terminals 2 and 3 when:

$$I_1 NR = I_2 R$$

Transposing terms we obtain:

$$N = I_2 / I_1$$

In other words the current supplied by the booster power supply will be $N$ times the current supplied by the reference power supply In a practical system $N$ may be any suitable whole number and to make the system of significant advantage $N$ will be of the order of say 25 to 100 or more. In other words a small capacity power supply having superior stability and regulating characteristics is shown controlling load current predominantly supplied by a high capacity less stable or well regulated power supply. The actual load current may be varied by varying the resistance value of variable feedback resistor 25. The overall stability and regulation of the combination is primarily determined by the stability and gain of the power supply, providing the reference.

Figure 2:
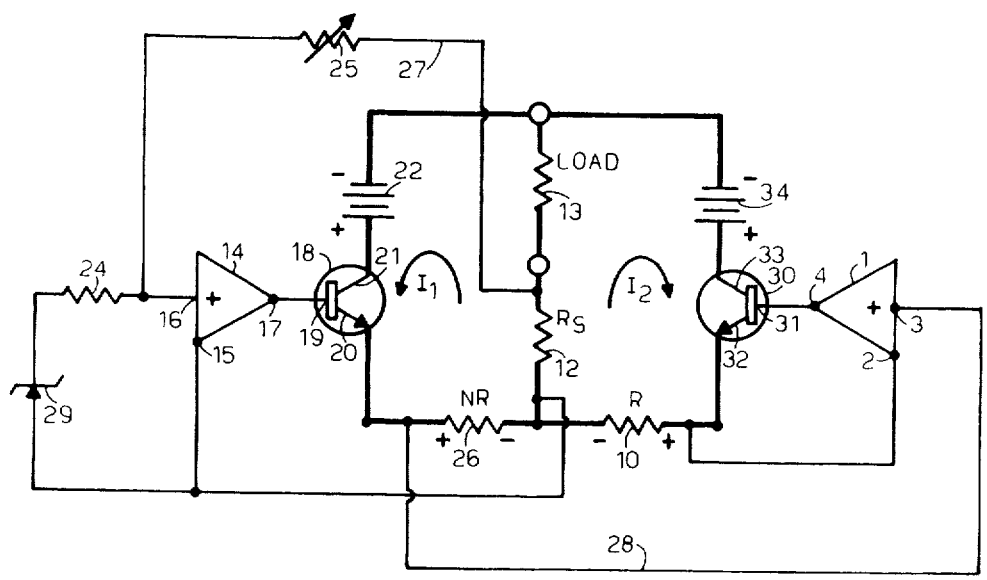
FIG. 2 is a similar simplified circuit diagram of the present invention modified to use an opposite polarity of pass transistor in the booster power supply.

The main current paths in both FIGS. 1 and 2 are shown in heavy line.

FIG. 2 is a simplified diagram of two power supplies connected to be programmed and regulated in the same way as the two supplies of FIG. 1 except the circuits have been rearranged to accommodate an NPN pass transistor in the booster power supply instead of the PNP shown in FIG. 1. Similar numbers are shown on similar parts in FIG. 2 and which function in the same way. Pass transistor 30 includes base 31 connected to output terminal 4 of amplifier 1 collector 33 connected to the positive terminal of unregulated voltage source 34 and emitter 32 connected to common terminal 2 and to one end of current sensing resistor 10. The negative terminal of source 34 is connected to one end of load 13 as is the negative end of source 22. Emitter 20 is connected to one end of current proportioning resistor 26 and over lead 28 to non-inverting input terminal 3. The other ends of current sensing resistors 10 and current proportioning resistor 26 are connected together and to one end of current sensing resistor 12 and to common terminal 15. The other end of current sensing resistor 12 is connected to the other end of load 13 and this point is also connected over lead 27 to feedback resistor 25.

Except for the transposition of parts and polarity changes this circuit operates in the same manner as does FIG. 1 as described in detail above. The reference voltage source is shown as a conventional zener diode reference 29.

I claim:

1. In a current regulating system, the combination of;
   a first (14-18) feedback regulated power supply including a common terminal (15), an output terminal and a feedback terminal (16);
   a first current sensing resistor (12);
   a second current sensing resistor (10);
   a current proportioning resistor (26);
   a pair of load terminals;
   a first series circuit comprising said first current sensing resistor, said current proportioning resistor and said load terminals connected between said common terminal and said output terminal;
   a second feedback regulated power supply (1-5) including a common terminal (2), an output terminal and a feedback terminal (3);
   a second series circuit comprising said first (12) and second (10) current sensing resistors and said load terminals connected between said common terminal and said output terminal of said second power supply;
   feedback circuit means for applying the voltage drops across said first and second current sensing resistors to said feedback terminal (3) of said second power supply;
   and a feedback circuit including in series a gain control resistor (25) connected across said first current sensing resistor (12).

2. A current regulating system as set forth in claim 1;
   wherein the resistance of said current proportioning sensing resistor is many times the resistance of said second current sensing resistor.

3. A current regulating system as set forth in claim 1;
   wherein the output circuit of said first power supply comprises a pass transistor and a source of unregulated direct current connected in series between said common terminal and said output terminal.

4. A current regulating system as set forth in claim 1;
   wherein the output circuit of said second power supply comprises a pass transistor and a source of unregulated direct current connected in series between said common terminal and said output terminal.

5. A current regulating system as set forth in claim 1;
   wherein the resistance of said current proportioning resistor is greater than 25 times the resistance of said second current sensing resistor.

6. A current regulating system as set forth in claim 1;
   wherein said two power supplies are poled to apply direct current across said load terminals in the same direction.

7. A current regulating system as set forth in claim 1;
   wherein the feedback circuit means to said first power supply feedback terminal includes an adjustable resistor in series connection.

8. A current regulating system as set forth in claim 1, and including;
   a source of reference voltage and a reference resistor in series connected between the common terminal and the feedback terminal of said first power supply.

* * * * *